United States Patent
Mizutani et al.

[11] Patent Number: 5,759,128
[45] Date of Patent: Jun. 2, 1998

[54] DRIVE ASSEMBLY HAVING ELECTRIC MOTOR AND DIFFERENTIAL GEAR DEVICE DISPOSED WITHIN ROTOR OF THE MOTOR

[75] Inventors: Ryoji Mizutani, Aichi; Takao Miyatani; Tetsuya Sugimoto, both of Toyota, all of Japan

[73] Assignee: Toyota Jidosha Kabushiki Kaisha, Toyota, Japan

[21] Appl. No.: 707,755

[22] Filed: Sep. 4, 1996

[30] Foreign Application Priority Data

Sep. 4, 1995 [JP] Japan ............... 7-226288

[51] Int. Cl.$^6$ ............................... H02K 7/00
[52] U.S. Cl. ............................. 425/149; 74/606 R
[58] Field of Search ........................ 74/606 R; 475/149, 475/150; 310/67 R, 83, 90, 266; 384/438

[56] References Cited

U.S. PATENT DOCUMENTS

| 2,450,290 | 9/1948 | Maxwell ................. 475/149 X |
| 4,467,230 | 8/1984 | Rovinsky . | |

FOREIGN PATENT DOCUMENTS

| 0 463 895 | 1/1992 | European Pat. Off. . | |
| 0 587 389 | 3/1994 | European Pat. Off. . | |
| 2719413 | 4/1977 | Germany ..................... 310/83 |
| 64-39245 | 2/1989 | Japan . | |
| 6-92154 | 4/1994 | Japan ....................... 475/149 |
| 7-156673 | 6/1995 | Japan . | |

OTHER PUBLICATIONS

Database WPI, Derwent Publications, AM 91-251034, SU-A-1 597 304, Oct. 7, 1990.

Patent Abstracts of Japan, vol. 95, No. 6, Jul. 31, 1995, JP-A-07 059297, Mar. 3, 1995.

Patent Abstracts of Japan, vol. 95, Jul. 31, 1995, No. 6, JP-A-07 067288, Mar. 10, 1995.

*Primary Examiner*—Khoi Q. Ta
*Attorney, Agent, or Firm*—Oblon, Spivak, McClelland, Maier & Neustadt, P.C.

[57] ABSTRACT

A drive assembly including an electric motor, and a differential gear device which is integrally incorporated within a rotor of the electric motor and which has a gear case rotated with the rotor and a pair of output shafts that are disposed coaxially with the rotor and rotated by rotation of the gear case with the rotor, wherein the gear case of the differential gear device is supported by a housing of the electric motor through bearings interposed therebetween.

11 Claims, 2 Drawing Sheets

DRIVE ASSEMBLY HAVING ELECTRIC MOTOR AND DIFFERENTIAL GEAR DEVICE DISPOSED WITHIN ROTOR OF THE MOTOR

BACKGROUND OF THE INVENTION

1. Field of the Invention

The present invention relates in general to a drive assembly including an electric motor, and more particularly to such a drive assembly wherein a differential gear device is integrally incorporated within a rotor of the electric motor.

2. Discussion of the Related Art

There is proposed a drive assembly including an electric motor, and a differential gear device which is integrally incorporated within a rotor of the electric motor and which has a gear case rotated with the rotor and a pair of output shafts that are disposed coaxially with the rotor and rotated by rotation of the gear case with the rotor. An example of such a drive assembly including an electric motor is disclosed in U.S. Pat. No. 4,467,230 to Rovinsky. In this drive assembly, a gear case of a differential gear device and a rotor of an electric motor are supported by an output shaft of the differential gear device through a first set of bearings, and the output shaft is supported by a housing of the electric motor through a second set of bearings.

In the drive assembly disclosed in the U.S. Patent identified above, the provision of the two sets of bearings between the rotor and the housing of the electric motor tend to increase the structural complexity and the size of the drive assembly. Further, the differential gear device tends to limit or reduce the inside diameter of the motor rotor, leading to an insufficient output torque of the electric motor, particularly where the drive assembly is used for driving an electric motor vehicle and is therefore required to have relatively small radial and axial dimensions. In the case where the output shaft of the differential gear device is directly used as axle shafts of the electric motor vehicle, for instance, the maximum outside diameter of the electric motor is limited in order to assure the required minimum height of the axle shafts from the road surface, and the maximum length of the motor is also limited to minimize the angular range of uniform motion joints associated with the axle shafts. In this case, therefore, the complexity of the structure for supporting the differential gear device within the electric motor results in a comparatively reduced space for installation of the rotor, stator and other components of the motor, and an accordingly reduced output torque of the motor. Moreover, the structural complexity tends to reduce the positioning accuracy of the rotor relative to the stator, leading to deteriorated performance of the electric motor.

SUMMARY OF THE INVENTION

The present invention was developed in the light of the above drawback experienced in the related art. It is accordingly an object of the present invention to provide a drive assembly including an electric motor, which is relatively simple in construction and which assures a sufficient output torque of the motor, improved positioning accuracy of the rotor of the motor, and improved operating performance and reliability of the electric motor.

The above object may be achieved according to the principle of this invention, which provides a drive assembly including an electric motor with a housing, and a differential gear device which is integrally incorporated within a rotor of the electric motor and which has a gear case rotated with the rotor and a pair of output shafts that are disposed coaxially with the rotor and rotated by rotation of the gear case with the rotor, wherein bearing means is interposed between the gear case of the differential gear device and the housing of the electric motor, and the gear case is supported by the housing of the electric motor through the bearing means.

In the drive assembly of the present invention constructed as described above, the gear case of the differential gear device is supported by the housing of the electric motor through suitable bearing means, so that the structure of the drive assembly can be simplified, and the axial and radial dimensions of the drive assembly can be reduced. Further, the drive assembly 10 be formed with an increased interior space for accommodating the components of the electric motor, thereby making it possible to increase the output torque of the electric motor. Thus, the present drive assembly can be constructed comparatively compact while permitting the electric motor to provide a sufficiently large output torque. In addition, the rotor integrally secured to the gear case can be positioned with improved accuracy, whereby the performance and reliability of the electric motor are significantly improved with high stability.

The present drive assembly is particularly suitably used as a drive source for driving an electric motor vehicle, but may find other applications for rotating appropriate members. Various motors such as AC motors of permanent magnet type may be used as the electric motor included in this drive assembly. The differential gear device may include a pinion shaft extending perpendicularly to the axes of the output shafts and fixed to the gear case, a pair of driving pinion gears freely rotatably mounted on the pinion shaft, and a pair of driven side gears which mesh with the pair of driving pinion gears and which are splined to the output shafts, respectively.

In one preferred form of the present invention, the drive assembly further includes sealing means for preventing a leakage flow of a lubricating oil from an interior of the gear case into an interior of the housing of the electric motor.

In the above preferred form of the drive assembly which includes the sealing means for preventing the leakage flow of the lubricating oil from the interior of the gear case into the interior of the motor housing, the electric motor is protected against contamination of the motor housing with metal particles, which are generated by meshing engagement of the gears within the differential gear device and which would be carried with the lubricating oil into the motor housing. Thus, the present arrangement is effective to assure intended performance of the electric motor for a prolong period of time. It is also noted that since the leakage flow of the lubricating oil from the gear case is prevented, the drive assembly need not be provided with an oil pan for receiving the lubricating oil leaking from the gear case, so that the largest diameter of the differential gear device can be reduced. Accordingly, the inside diameter of the rotor can be reduced, so that the drive assembly as a whole can be small-sized, or the output torque of the electric motor can be increased while maintaining the size of the drive assembly.

Although the sealing means is provided for preventing the lubricating oil from flowing from the differential gear device into the motor housing, the motor housing may be filled with a coolant for cooling the stator coil windings and other components of the electric motor. Alternatively, the electric motor may be air-cooled, or the motor housing may be formed with fluid passages through which a suitable coolant fluid is circulated for cooling the electric motor through the wall of the motor housing.

In another preferred form of this invention, the rotor comprises: (a) a generally cylindrical rotor yoke consisting of metal plates which are superposed on each other in an axial direction of the rotor and each of which has a polygonal aperture; (b) permanent magnets fixed on an outer circumferential surface of the generally cylindrical rotor yoke; and (c) a generally cylindrical metal core which has an outer profile substantially similar to a polygonal shape of the polygonal aperture and on which the generally cylindrical rotor yoke is fitted at the polygonal aperture of the each metal plate thereof such that the generally cylindrical metal core and the generally cylindrical rotor yoke are rotated together, the gear case of the differential gear device being fixedly disposed in the generally cylindrical metal core so that the gear case is rotated with the rotor.

In the above form of the drive assembly, the rotor yoke has a polygonal inner profile, and the metal core which engages the rotor yoke has a generally polygonal inner profile substantially similar to the polygonal shape of the inner profile of the rotor yoke. This arrangement permits an increase in the torque that can be transmitted between these rotor yoke and metal core and make it possible to reduce the required wall thickness of the metal core and accordingly increase the interior space for accommodating the differential gear device, while assuring a comparatively compact structure of the drive assembly.

The number of angles or sides of the polygon of the rotor yoke and the metal core is selected preferably within a range of about 6–12, more preferably within a range of about 8–10. The inside diameter of the metal core decreases with a decrease in the number of the angles of the polygon, while on the other hand the maximum torque that can be transmitted between the metal core and the rotor yoke decreases with an increase in the number of the polygon angles.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
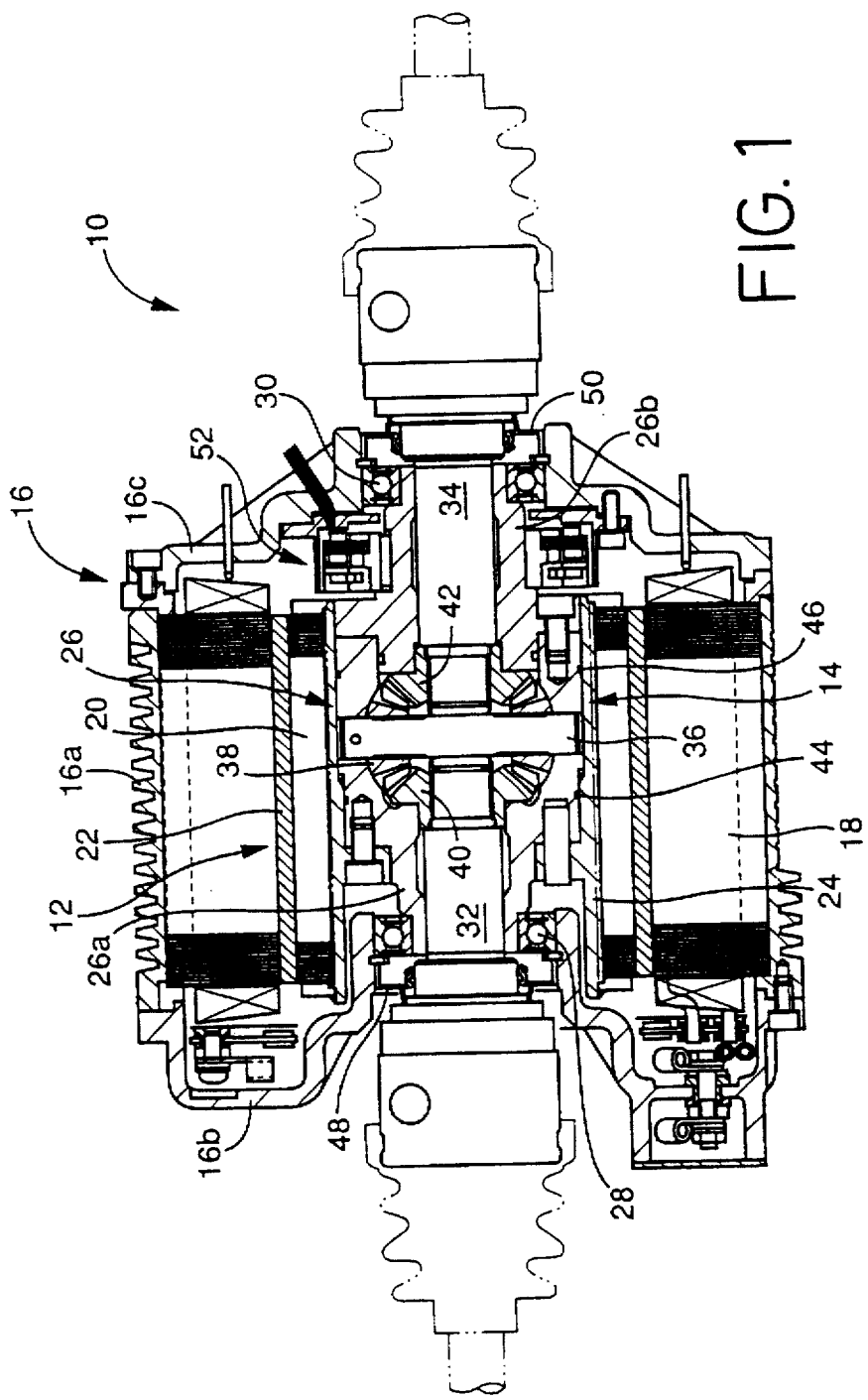
FIG. 1 is an elevational view in axial cross section of a drive assembly of an electric motor vehicle, which includes an electric motor constructed according to one embodiment of the present invention.
Figure 2:
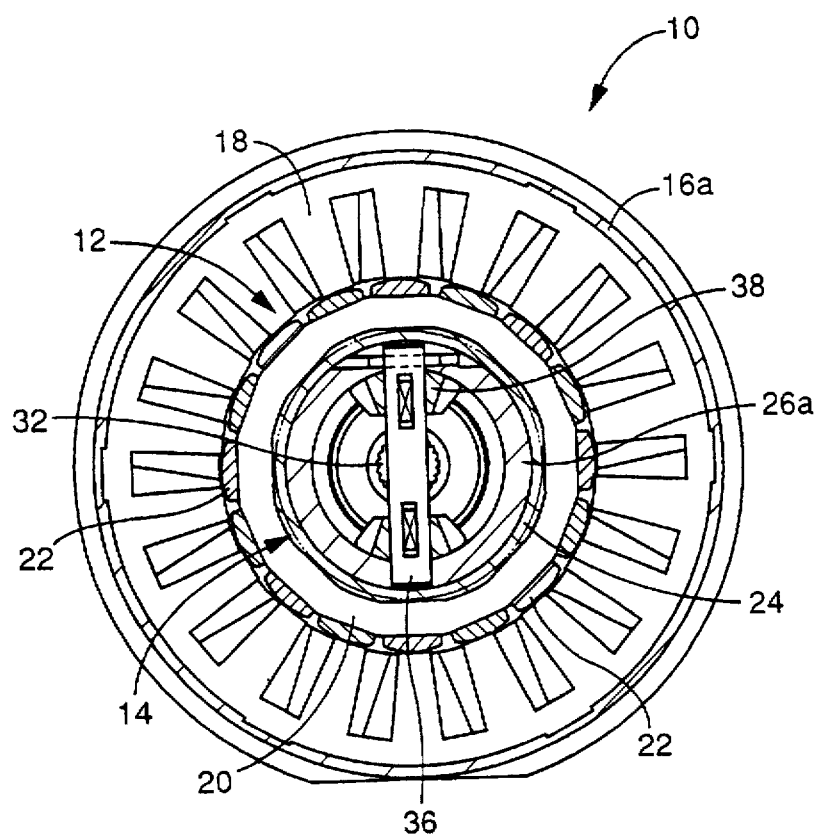
FIG. 2 is a transverse cross sectional view of the drive device of FIG. 1.

Referring to FIGS. 1 and 2, the drive assembly embodying the present invention is shown generally at 10. The drive assembly 10, which is adapted to drive an electric motor vehicle, includes an alternating current electric motor of permanent magnet type. This electric motor includes a rotor 12 in which a differential gear device 14 of bevel gear type is incorporated.

The drive assembly 10 is installed on the electric motor vehicle such that the axial direction of the drive assembly 10 (right and left direction as seen in FIG. 1) is parallel to the transverse or widthwise direction of the motor vehicle, which is perpendicular to the running or longitudinal direction of the motor vehicle. The drive assembly 10 has a housing 16 which also serves as a housing for the electric motor. The housing 16 is formed with a multiplicity of cooling fins, and consists of a cylindrical member 16a, and a pair of side covering members 16b, 16c which are bolted to the opposite open ends of the cylindrical member 16a, so as to close the open ends of the cylindrical member 16a. The cylindrical member 16a is formed of an iron material and functions as a stator yoke when the electric motor is overloaded. Within the cylindrical member 16a, there is disposed a stator 18 such that the stator 18 is stationary relative to the housing 16. The stationary stator 18 consists of multiple stator cores each formed from a silicon steel plate, and multiple coil windings wound on the cores.

The rotor 12 consists of a generally cylindrical rotor yoke 20, a multiplicity of permanent magnets 22 secured to the outer circumferential surface of the rotor yoke 20 by an adhesive, for example, and a metal core 24 press-fitted in the rotor yoke 20. The rotor yoke 20 consists of a multiplicity of silicon steel plates superposed on each other in the direction of thickness, namely, in the axial direction of the rotor 12. Within the metal core 24 of the rotor 12, there is integrally accommodated the gear case 26 of the differential gear device 14 such that the gear case 26 is bolted to the metal core 24 and prevented by pins from rotating relative to the metal core 24. That is, the differential gear device 14 including the gear case 26 and the rotor 12 including the metal core 24 are fixed together as a unit by bolts and pins.

The metal core 24 is made of an iron material and functions as a rotor yoke when the electric motor is overloaded. The metal core 24 is a generally cylindrical thin-walled member whose outer circumferential surface is equiangularly cut flat at 45° angular intervals, so that the generally cylindrical metal core 24 has a generally octagonal outer profile in transverse cross section. However, the outer circumferential surface of the metal core 24 is partially left uncut, leaving part-cylindrical or arcuate parts each between adjacent flat faces. That is, the eight flat faces and the part-cylindrical parts are alternately arranged in the circumferential direction of the metal core 24 such that the flat faces are spaced from each other by the part-cylindrical surfaces, each of which has a predetermined dimension in the circumferential direction of the metal core 24. The rotor yoke 20 has a hole having an octagonal shape corresponding to the generally octagonal outer profile of the metal core 24. That is, each of the silicon steel plates of the generally cylindrical rotor yoke 20 has an octagonal aperture, so that the octagonal apertures of these plates cooperate to define the above-indicated hole of the rotor yoke 20. The rotor yoke 20 is fitted on the generally octagonal outer surface of the metal core 24 such that these members 20, 24 are not rotatable relative to each other. The rotor yoke 20 and the metal core 24 are positioned relative to each other with a high degree of concentricity owing to the part-cylindrical surfaces left on the metal core 24. The hole of the rotor yoke 20 is formed by pressing with high precision, and cooperates with the part-cylindrical surfaces of the metal core 24 to assure a highly accurate coaxial relationship between the rotor yoke 20 and the metal core 24.

The gear case 26 of the differential gear device 14 consists of a first casing member 26a and a second casing member 26b. These first and second casing members 26a, 26b are arranged in the axial direction and bolted together at an axially middle portion of the gear case 26. The first and second casing members 26a, 26b have respective cylindrical portions extending in the opposite directions away from each other. The first casing member 26a is supported rotatably about its axis by the side covering member 16b through a first bearing 28, while the second casing member 26b is supported rotatably about its axis by the side covering member 16c through a second bearing 30. These first and second bearings 28, 30 are fixedly held in position in center apertures formed in the side covering members 16b, 16c, respectively. The differential gear device 14 has a pair of output shafts in the form of a left axle shaft 32 and a right axle shaft 34. The first casing member 26a rotatably supports the left axle shaft 32 through a slide bearing, while the second casing member 26b rotatably supports the right axle shaft 34 through another slide bearing. These axle shafts 32, 34 are coupled to respective drive wheels of the electric motor vehicle through respective uniform motion joints.

The differential gear device 14 includes a pinion shaft 36, a pair of driving gears in the form of pinion gears 38 freely rotatably mounted on the pinion shaft 36, and a pair of driven gears in the form of side gears 40, 42 which mesh with the two pinion gears 38, respectively. The pinion shaft 36 is disposed on the gear case 26 such that the pinion shaft 36 is perpendicular to the axis of rotation of the differential gear device 14. The side gears 40, 42 are splined to the respective axle shafts 32, 34 such that the side gears 40, 42 are axially slidable on the axle shafts 32, 34 and rotated with the axle shafts 32, 34.

The interior of the gear case 26 is filled with a suitable lubricating oil. Two O-rings 44, 46 are disposed on the outer circumferential surface of the gear case 26, at respective positions which are spaced from each other in the axial direction of the gear case 26 and located on the opposite sides of the centerline of the pinion shaft 36. The O-rings 46, 48 assure fluid tightness between the inner circumferential surface of the metal core 24 and the outer circumferential surface of the gear case 26. Further, two dust seals 48, 50 are provided between the respective covering members 16b, 16c and the respective axle shafts 32, 34, so that the lubricating oil is retained in the interior of the gear case 26 with a high degree of fluid tightness. The first and second bearings 28, 30 are grease-lubricated double sealed bearings, which prevent leakage of the lubricating oil from the interior of the gear case 26 into the interior of the housing 16, namely, toward the rotor 12, stator 18 and other components of the electric motor. These bearings 28, 30 and the O-rings 44, 46 cooperate to provide sealing means for preventing a flow of the lubricating oil from the interior of the gear case 26 into the housing 16.

In the electric motor vehicle drive assembly 10 constructed as described above, the gear case 26 of the differential gear device 14 is supported by the housing 16 through bearing means in the form of the pair of bearings 28, 30, so that the structure of the drive assembly 10 can be simplified, and the axial and radial dimensions of the drive assembly 10 can be reduced. Further, the drive assembly 10 can be formed with an increased space for accommodating the components of the electric motor, thereby making it possible to increase the output torque of the electric motor. Thus, the present drive assembly 10 can be constructed comparatively compact while permitting the electric motor to provide a sufficiently large output torque, and can therefore be suitably used for driving an electric motor vehicle. In addition, the rotor 12 integrally secured to the gear case 26 can be positioned relative to the stator 18 with improved accuracy, whereby the performance and reliability of the electric motor are significantly improved with high stability.

It is also noted that the gear case 26 of the differential gear device 14 is fluid-tightly enclosed by the O-rings 44, 46, dust seals 48, 50 and double sealed bearings 28, 30, so as to prevent a leakage flow of the lubricating oil from the interior of the gear case 26, thereby permitting intended lubrication within the gear case 26 for a prolonged period of time. Further, this excellent sealing of the gear case 26 prevents the interior of the housing 16 from being contaminated with metal particles, which are generated by meshing engagement of the teeth of the pinion and side gears 38, 40 within the gear case 26 and which would be carried with the lubricating oil into the housing 16. Thus, the present arrangement is effective to avoid a risk of deterioration of the performance of the electric motor due to such metal particles entered in an air gap between the rotor 12 and the stator 18. Since the leakage flow of the lubricating oil from the gear case 26 is prevented, the drive assembly 10 need not be provided with an oil pan for receiving the lubricating oil leaking from the gear case 26, so that the largest diameter of the differential gear device 14 can be reduced to the diameter of the gear case 26, that is, to the length of the pinion shaft 36. Accordingly, the inside diameter of the rotor 12 can be reduced, so that the drive assembly 10 as a whole can be small-sized, or the output torque of the electric motor can be increased while maintaining the size of the drive assembly 10.

It is also noted that the generally octagonal outer profile of the metal core 24 and the corresponding inner profile of the rotor yoke 20 which engages the metal core 24 permit an increase in the torque that can be transmitted between these members 20, 24, and make it possible to reduce the required wall thickness of the metal core 24 and accordingly increase the interior space for accommodating the differential gear device 14, while assuring a comparatively compact structure of the drive assembly 10. Since the metal core made of iron functions as a rotor yoke upon overloading of the electric motor, the required diameter of the rotor yoke 20 can be reduced leading to dimensional reduction of the drive assembly 10 or increase of the output torque of the electric motor, while avoiding magnetic saturation of the motor even when the motor is overloaded. Similarly, the cylindrical member 16a of the housing 16 functions as a stator yoke upon overloading of the electric motor, so that the required diameter of the stator 18 can be reduced leading to dimensional reduction of the drive assembly 10 or increase of the motor output torque, while avoiding magnetic saturation of the motor even when the motor is overloaded.

In the present drive assembly 10, the differential gear device 14 and the rotor 12 of the electric motor can be removed from the drive assembly 10 in the right direction as seen in FIG. 1, by simply removing the right-hand side covering member 16b. Since the rotor 12 and the differential gear device 14 are fixed together as a unit by bolts and pins, the differential gear device 14 with the rotor 12 fixed to the gear case 26 can be built in the housing 16 after the differential gear device 14 alone is subjected to an inspection for normal functioning. The electric motor including the rotor 12 and the stator 18 can be inspected for normal functioning, independently of the differential gear device 14, such that the rotor 12 is attached to or supported by the gear case 26 alone. Since the gear case 26 of the differential gear 14 and the rotor 12 are positioned relative to the housing 16 via the bearings 28, 30, the differential gear device 14 and the housing 16 can be assembled with only a small amount of positioning error due to dimensional variations or allowances of the gear case 26, rotor 12 and housing 16, whereby the functional inspection of the electric motor can be achieved without or independently of the differential gear device 14, namely, with only the gear case 26 supporting the rotor 12. The side covering member 16c has a rotary position sensor 52 disposed thereon. This sensor 52 is mechanically separate from the stator 18, so that the side covering member 16c can be removed separately from the stator 18.

In the present drive assembly 10, the gear case 26 consists of the separate first and second casing members 26a, 26b which are arranged in the axial direction and bolted together. Accordingly, these casing members 26a, 26b can be easily manufactured by machining on a lathe or turning machine, whereby the cost of manufacture of the gear case 26 can be reduced.

While the presently preferred embodiment of the present invention has been described above in detail by reference to the accompanying drawings, it is to be understood that the invention is not limited to the details of the illustrated embodiment, but may be otherwise embodied.

In the differential gear device 14 of the drive assembly 10 in the illustrated embodiment, the two driving pinion gears 38 are mounted on the single pinion shaft 36. However, the differential gear device may be modified as needed, in the numbers of the pinion shaft(s) and driving pinion gears, and in the arrangement of these members.

While the O-rings 44, 46 are provided on the outer circumferential surface of the gear case 26 in the illustrated embodiment, suitable sealing means may be provided between the pinion shaft 36 and the first member 26a of the gear case 26, to secure fluid tightness of the interior of the gear case 26.

It is to be understood that the present invention may be embodied with various other changes, modifications and improvements, which may occur to those skilled in the art, in the light of the foregoing teachings.

What is claimed is:

1. A drive assembly comprising:
   an electric motor with a housing, said housing including a cylindrical member and a pair of side covering members which close opposite open ends of said cylindrical member, said pair of side covering members having respective center apertures formed therethrough;
   a differential gear device which is integrally incorporated within a rotor of said electric motor and which has a gear case rotated with said rotor and a pair of output shafts that are disposed coaxially with said rotor and rotated by rotation of said gear case with said rotor;
   bearing means interposed between said gear case of said differential gear device and said housing of said electric motor, said bearing means including a first bearing and a second bearing which are fixedly held in position in said respective center apertures of said side covering members of said housing; and
   wherein said gear case is supported by said housing of said electric motor through said bearing means.

2. A drive assembly comprising:
   an electric motor with a housing;
   a differential gear device which is integrally incorporated within a rotor of said electric motor and which has a gear case rotated with said rotor and a pair of output shafts that are disposed coaxially with said rotor and rotated by rotation of said gear case with said rotor;
   bearing means interposed between said gear case of said differential gear device and said housing of said electric motor;
   wherein said gear case is supported by said housing of said electric motor through said bearing means and said rotor comprises,
   (a) a generally cylindrical rotor yoke consisting of metal plates which are superposed on each other in an axial direction of said rotor and each of which has a polygonal aperture,
   (b) permanent magnets fixed on an outer circumferential surface of said generally cylindrical rotor yoke, and
   (c) a generally cylindrical metal core which has an outer profile substantially similar to a polygonal shape of said polygonal aperture and on which said generally cylindrical rotor yoke is fitted at said polygonal aperture of said each metal plate thereof such that said generally cylindrical metal core and said generally cylindrical rotor yoke are rotated together; and
   wherein said gear case of said differential gear device is fixedly disposed in said generally cylindrical metal core so that said gear case is rotated with said rotor.

3. A drive assembly according to claim 1, wherein said gear case consists of a first casing member and a second casing member which are arranged in an axial direction of said gear case, said first casing member being rotatably supported by said first bearing, and said second casing member being rotatably supported by said second bearing.

4. A drive assembly according to claim 2 further including sealing means for preventing a leakage flow of a lubricating oil from an interior of said gear case into an interior of said housing of said electric motor.

5. A drive assembly according to claim 4, wherein said bearing means includes a plurality of sealed bearings which constitute part of said sealing means.

6. A drive assembly according to claim 5, wherein said housing of said electric motor includes a cylindrical member, and a pair of side covering members which close opposite open ends of said cylindrical member, said sealed bearings consisting of a first sealed bearing and a second sealed bearing which are fixedly held in position in center apertures formed in said pair of side covering members, respectively.

7. A drive assembly according to claim 6, wherein said gear case consists of a first casing member and a second casing member which are arranged in an axial direction of said gear case, said first casing member being rotatably supported by said first sealed bearing, and said second casing member being rotatably supported by said second sealed bearing.

8. A drive assembly according to claim 4, wherein said sealing means includes a plurality of sealing members disposed between an outer circumferential surface of said gear case and an inner circumferential surface of said rotor.

9. A drive assembly according to claim 2, wherein said outer profile of said generally cylindrical metal core is defined by a plurality of flat faces and a plurality of part-cylindrical surfaces which are alternately arranged in a circumferential direction of said generally cylindrical metal core such that said flat faces are spaced apart from each other by said part-cylindrical surfaces.

10. A drive assembly according to claim 2, wherein said differential gear device includes a pinion shaft extending perpendicularly to axes of said pair of output shafts and fixed to said gear case, a pair of driving pinion gears freely rotatably mounted on said pinion shaft, and a pair of driven side gears which mesh with said pair of driving pinion gears and which are splined to said pair of output shafts, respectively.

11. A drive assembly according to claim 2, wherein said pair of output shafts are connected to respective drive wheels of an electric motor vehicle.

* * * * *